US012428184B2

(12) United States Patent
Nambu

(10) Patent No.: US 12,428,184 B2
(45) Date of Patent: Sep. 30, 2025

(54) TRAY SUPPLY DEVICE AND EGG SORTING DEVICE

(71) Applicant: NABEL CO., LTD., Kyoto (JP)

(72) Inventor: Takahiko Nambu, Kyoto (JP)

(73) Assignee: NABEL CO., LTD., Kyoto (JP)

( * ) Notice: Subject to any disclaimer, the term of this patent is extended or adjusted under 35 U.S.C. 154(b) by 0 days.

(21) Appl. No.: 18/685,626

(22) PCT Filed: Sep. 6, 2022

(86) PCT No.: PCT/JP2022/033411
§ 371 (c)(1),
(2) Date: Feb. 22, 2024

(87) PCT Pub. No.: WO2023/038024
PCT Pub. Date: Mar. 16, 2023

(65) Prior Publication Data
US 2024/0351720 A1 Oct. 24, 2024

(30) Foreign Application Priority Data

Sep. 8, 2021 (JP) ................................. 2021-146043

(51) Int. Cl.
A01K 43/08 (2006.01)
B65B 23/02 (2006.01)
(Continued)

(52) U.S. Cl.
CPC .............. *B65B 23/02* (2013.01); *A01K 43/08* (2013.01); *B65B 23/06* (2013.01); *B65B 43/44* (2013.01);
(Continued)

(58) Field of Classification Search
CPC ........... B65B 5/068; B65B 5/08; B65B 5/101; B65B 23/02; B65B 23/06; B65B 35/32;
(Continued)

(56) References Cited

U.S. PATENT DOCUMENTS 3,297,201 A * 1/1967 Burt ..................... B65G 59/101
221/221
3,472,403 A * 10/1969 Mueller et al. ......... B65B 43/44
221/221

(Continued)

FOREIGN PATENT DOCUMENTS

EP 1201542 A1 * 5/2002 ............. B65B 23/06
EP 3135614 A1 3/2017
(Continued)

OTHER PUBLICATIONS

International Search Report issued in PCT/JP2022/033411; mailed Nov. 22, 2022.
(Continued)

*Primary Examiner* — Stephen F. Gerrity
(74) *Attorney, Agent, or Firm* — Studebaker Brackett PLLC

(57) ABSTRACT

A tray supply device that reduces effort and burden involved in an operation is provided. The present tray supply device includes a tray storage unit, a detection unit, and a distribution unit. The tray storage unit is provided so as to correspond to one of a plurality of accommodation units that cause eggs to be accommodated in trays. The detection unit detects the amount of the trays stored in each tray storage unit. The distribution unit distributes empty trays to each tray storage unit in accordance with a detection result of the detection unit. An orientation change unit is further included, which changes the orientation of the trays so that the trays are accommodable in each tray storage unit.

7 Claims, 5 Drawing Sheets

(51) Int. Cl.
- *B65B 23/06* (2006.01)
- *B65B 43/44* (2006.01)
- *B65B 43/52* (2006.01)
- *B65B 57/04* (2006.01)
- *B65B 57/14* (2006.01)
- *B65G 59/06* (2006.01)
- *G07F 11/12* (2006.01)

(52) U.S. Cl.
CPC .............. *B65B 43/52* (2013.01); *B65B 57/04* (2013.01); *B65B 57/14* (2013.01); *B65G 59/06* (2013.01); *G07F 11/12* (2013.01)

(58) Field of Classification Search
CPC ......... B65B 43/44; B65B 43/52; B65B 57/04; B65B 57/14; B65G 59/06; G07F 11/12; A01K 43/08
USPC ........ 53/502, 67, 539, 246, 251; 221/10, 11, 221/14
See application file for complete search history.

(56) References Cited

U.S. PATENT DOCUMENTS

| | | | | |
|---|---|---|---|---|
| 3,478,924 A | * | 11/1969 | Comstock | ............... B65B 43/44 221/213 |
| 4,687,403 A | * | 8/1987 | Motoda | .................. B65G 60/00 414/795.8 |
| 4,796,406 A | * | 1/1989 | Gies et al. | ............ B65B 43/145 414/795.8 |
| 4,867,342 A | * | 9/1989 | Muramatsu et al. | . B65B 43/145 221/105 |
| 2009/0038274 A1 | * | 2/2009 | Cash, III et al. | ....... B65B 43/44 53/493 |

FOREIGN PATENT DOCUMENTS

| | | | | | |
|---|---|---|---|---|---|
| JP | H08198451 | A | * | 8/1996 | ............. B65B 43/44 |
| JP | 2000-128124 | A | | 5/2000 | |
| JP | 2000-296806 | A | | 10/2000 | |
| JP | 2001114217 | A | * | 4/2001 | |
| JP | 2002179015 | A | * | 6/2002 | |
| JP | 2002225811 | A | * | 8/2002 | |
| JP | 2005041534 | A | * | 2/2005 | |
| JP | 3118194 | U | * | 1/2006 | |
| JP | 2016-078971 | A | | 5/2016 | |
| JP | 2017-088193 | A | | 5/2017 | |
| JP | 2020024641 | A | * | 2/2020 | |
| JP | 2020-125130 | A | | 8/2020 | |

OTHER PUBLICATIONS

"Notice of Reasons for Refusal" Office Action issued in JP 2023-546944; mailed by the Japanese Patent Office on Jun. 16, 2025.

* cited by examiner

TRAY SUPPLY DEVICE AND EGG SORTING DEVICE

TECHNICAL FIELD

The present invention relates to a tray supply device for automatically supplying trays to accommodate eggs.

BACKGROUND ART

In a GP center, eggs that have been graded according to their weight, etc. are packaged into trays or the like using an automatic egg grading and packaging device (see PTL 1 for example). The automatic egg grading and packaging device includes a tray conveyor for transferring trays, and on the upstream side of the tray conveyor, includes a tray storage unit for supplying empty trays to the tray conveyor. In this tray storage unit, the trays are placed on a pair of left and right supporting parts. On receiving a command from a controller, the tray storage unit supplies only one of the trays, which is positioned at the lowest level.

CITATION LIST

Patent Literature

PTL 1: Japanese Patent Laying-Open No. 2000-128124

SUMMARY OF INVENTION

Technical Problem

While a typical tray storage unit can automatically supply trays onto a tray conveyor from the state in which the trays are placed on a supporting unit, the trays need to be supplied onto the supporting unit manually by an operator. If a plurality of tray conveyors are provided, in particular, a plurality of tray storage units are also provided so as to correspond thereto, and accordingly, such an operation has involved much effort and burden.

An object of the present invention is to provide a tray supply device that reduces effort and burden involved in an operation.

Solution to Problem

A tray supply device of the present invention includes a tray storage unit provided so as to correspond to one of a plurality of accommodation units that cause eggs to be accommodated in trays, a detection unit that detects an amount of the trays stored in the tray storage unit, and a distribution unit that distributes the trays to the tray storage unit in accordance with a detection result of the detection unit.

Advantageous Effects of Invention

The present invention can provide a tray supply device that reduces effort and burden involved in an operation.

The above-described and other objects, features, aspects, and advantages of the present invention will be apparent from the following detailed description on the present invention, which will be understood with reference to the attached drawings.

DESCRIPTION OF EMBODIMENTS

Figure 1:
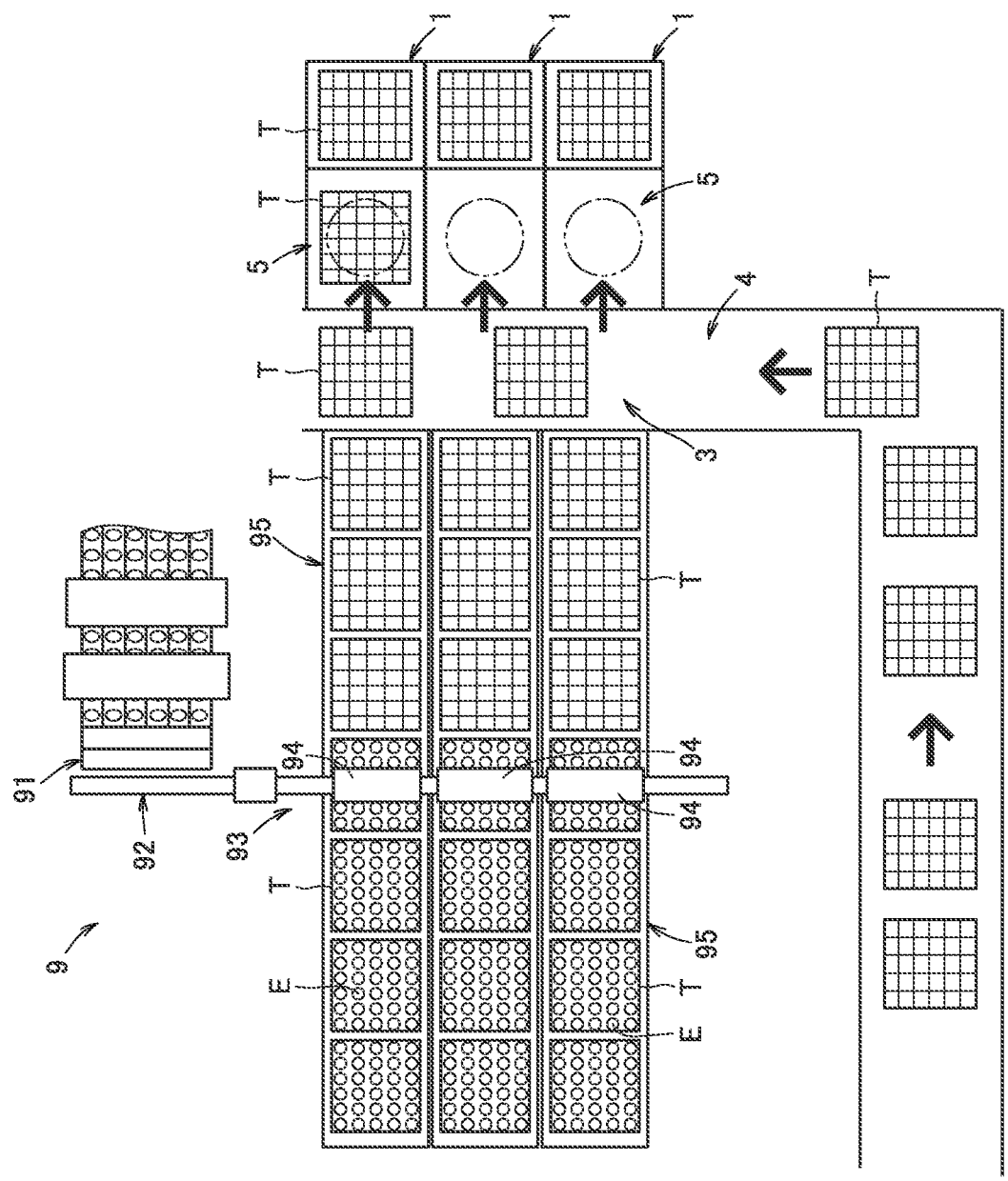
FIG. 1 is a plan view that illustrates an egg sorting device according to an embodiment of the present invention.
Figure 2:
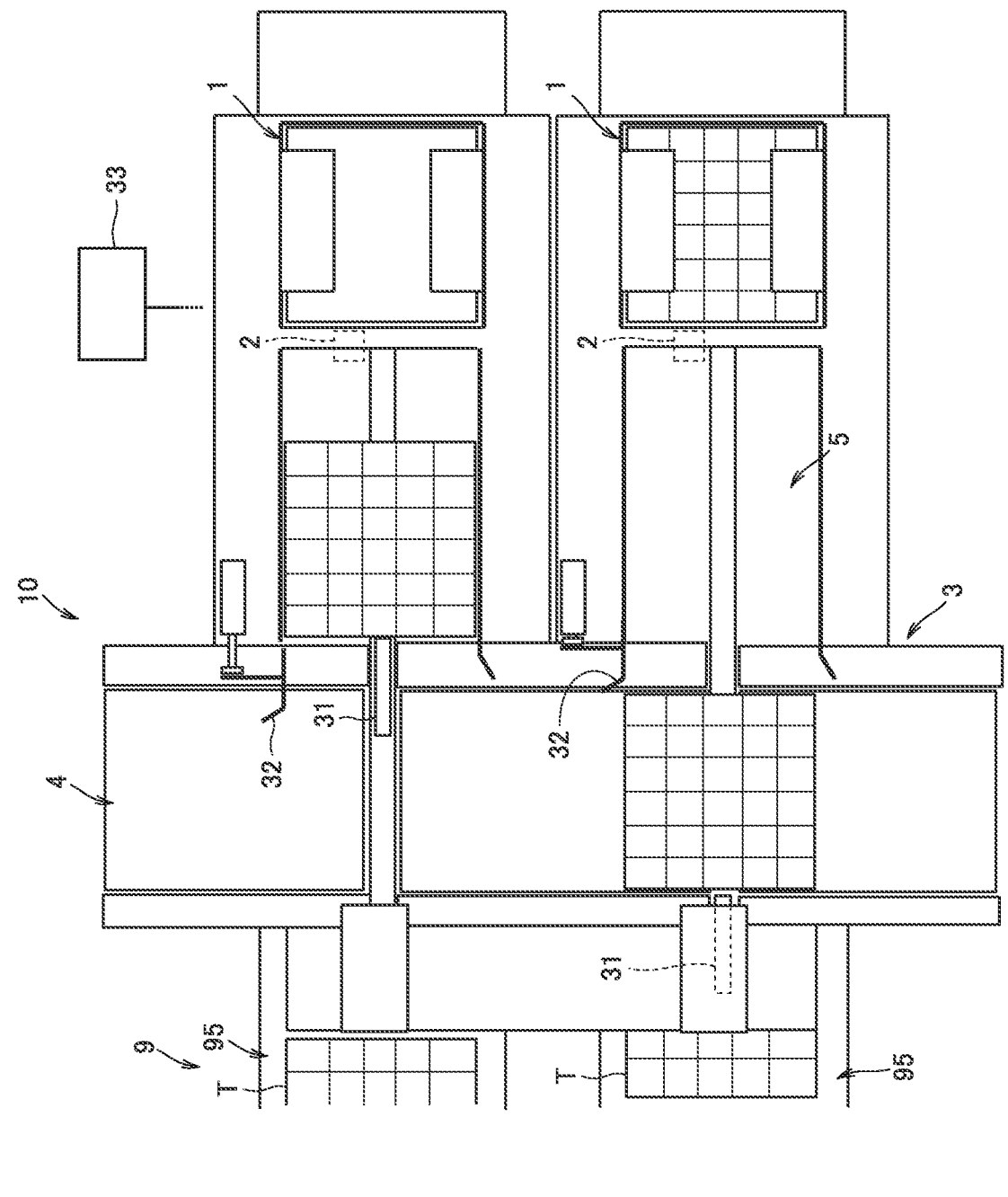
FIG. 2 is a plan view that schematically illustrates a tray supply device according to the embodiment.
Figure 3:
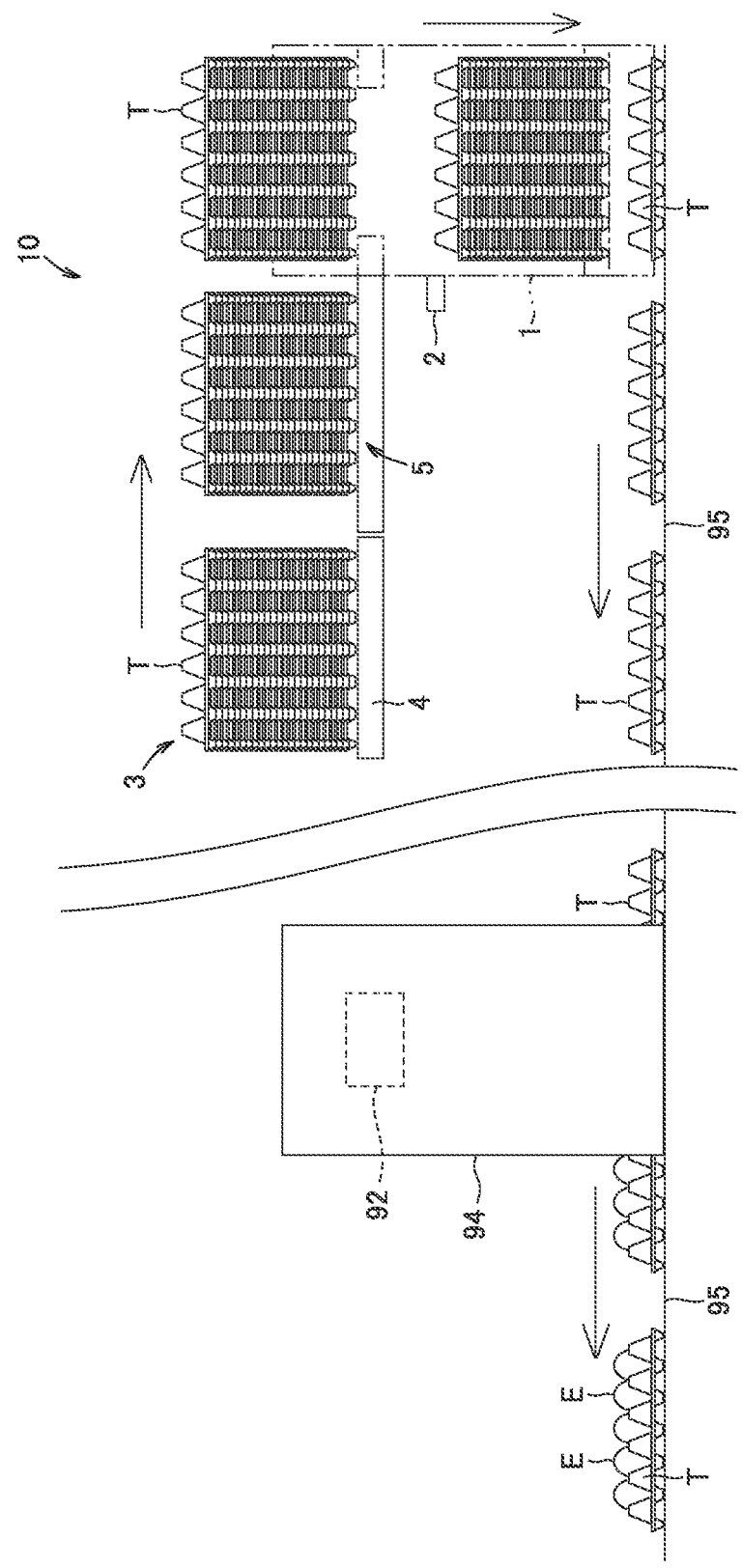
FIG. 3 is a side view that schematically illustrates the tray supply device according to the embodiment.
Figure 4:
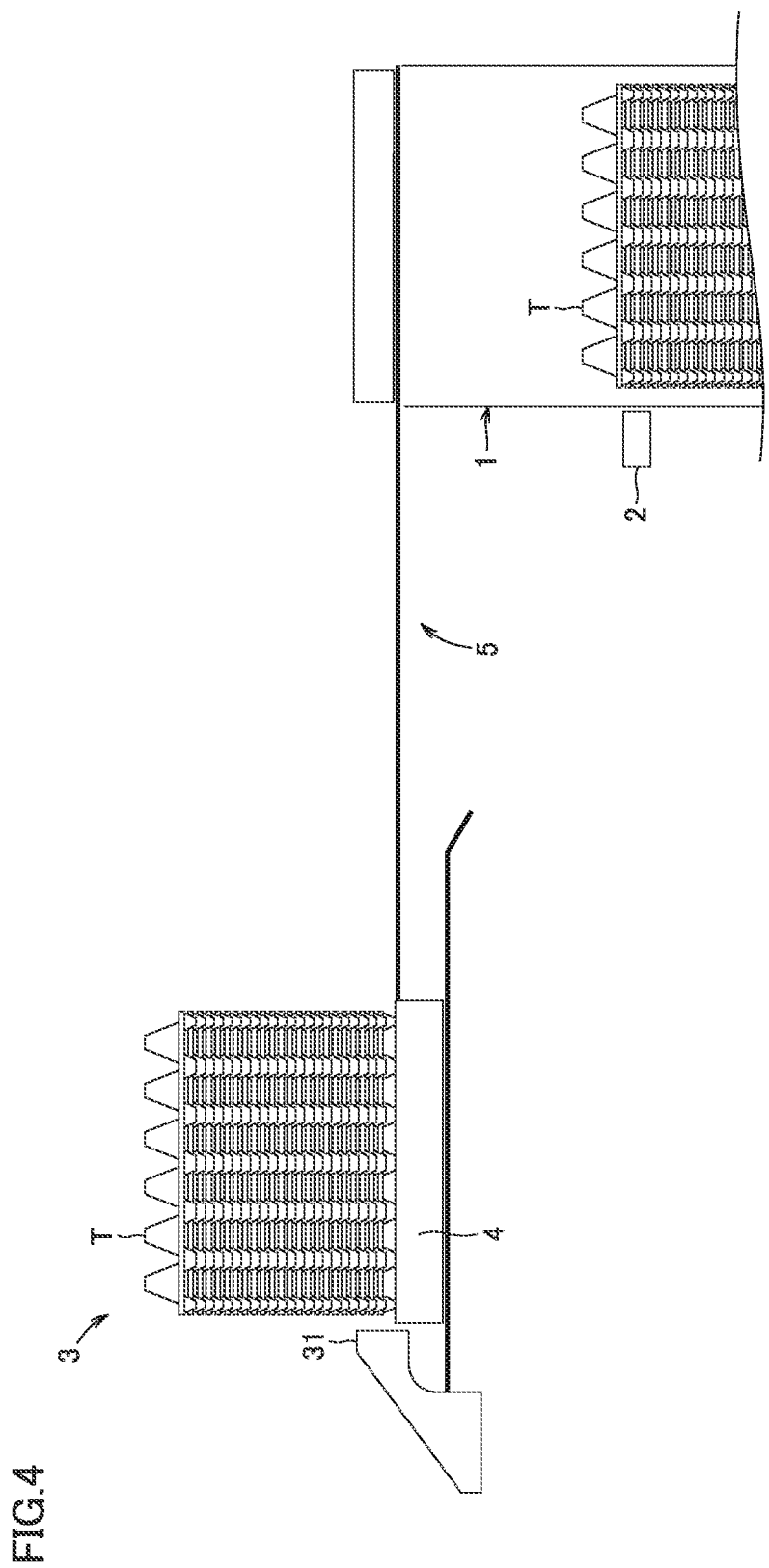
FIG. 4 is a side view that schematically illustrates the tray supply device according to the embodiment.
Figure 5:
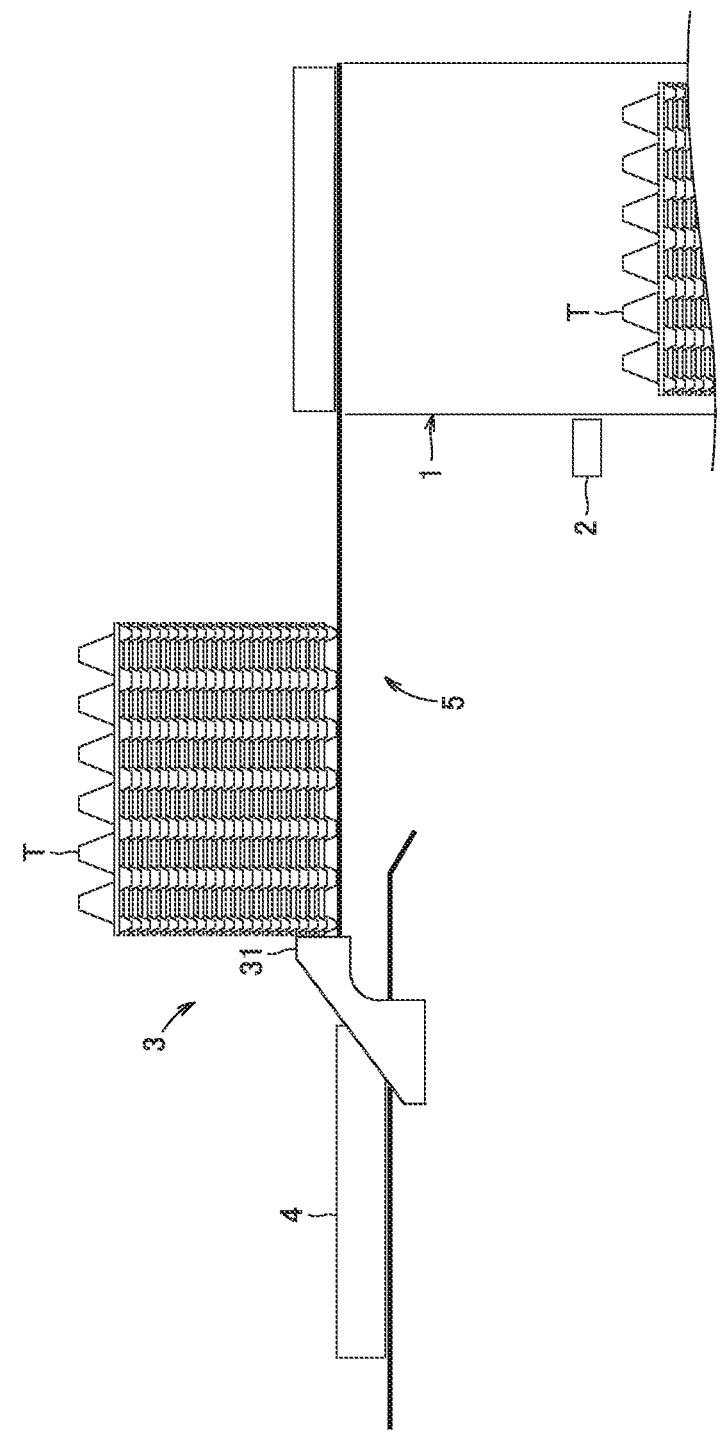
FIG. 5 is a view corresponding to FIG. 4, which schematically illustrates a state in which trays have been moved.

Description below refers to FIGS. 1 to 5. A tray supply device 10 according to the present embodiment is provided in an egg sorting device 9.

Egg sorting device 9 is mainly made up of a measurement unit 91, a first transfer unit 92, a distribution unit 93, an accommodation unit 94, and a second transfer unit 95. Measurement unit 91 measures the weight of each of eggs E. First transfer unit 92 is a transfer unit that transfers the eggs individually, which uses a holding unit (not illustrated) such as a carrier or a bucket to transfer eggs E after the measurement. Distribution unit 93 performs distribution to each accommodation unit 94 in accordance with a value measured by measurement unit 91. Accommodation unit 94 cancels a holding state in the holding unit and causes eggs E to be accommodated in a tray T placed under the holding unit. Accommodation units 94 are provided in a plurality of positions on first transfer unit 92.

Second transfer unit 95 is a transfer unit that transfers trays T one by one. Second transfer unit 95 is provided, for example, so as to be perpendicular to first transfer unit 92. Second transfer units 95 are provided so as to correspond to respective accommodation units 94. Second transfer unit 95 transfers empty trays T one by one from a tray storage unit 1, described later, to accommodation unit 94, receives eggs E discharged in accommodation unit 94 with tray T, and transfers tray T with eggs E accommodated therein from accommodation unit 94 to the downstream side. For example, tray T is made of plastic and can accommodate eggs E in six columns and five rows. Second transfer unit 95 may perform the transfer with the six-column side of tray T facing ahead or may perform the transfer with the five-row side of tray T facing ahead. In other words, an orientation in which tray T is transferred with its six lines extending in the traveling direction and an orientation in which tray T is transferred with its five lines extending in the traveling direction can be set. Second transfer unit 95 includes tray storage unit 1 on the upstream side.

Tray supply device 10 in the present embodiment includes tray storage unit 1, a detection unit 2, a distribution unit 3, a third transfer unit 4, and an orientation change unit 5.

Tray storage units 1 are provided so as to correspond to respective accommodation units 94 that cause eggs E to be accommodated in trays T. Tray storage unit 1 supplies empty trays T that are stacked onto second transfer unit 95. Tray storage unit 1 causes a tray support (not illustrated) to operate on receiving a command from a controller (not illustrated), and drops only one of trays T at the lowest level onto second transfer unit 95.

Detection unit 2 detects the amount of trays T stored in each tray storage unit 1. Detection unit 2 may use a photoelectric sensor or the like, or may utilize an image or the like. Detection unit 2 is provided for each tray storage unit 1.

Distribution unit 3 distributes empty trays T to each tray storage unit 1 in accordance with a detection result of detection unit 2. Distribution unit 3 is provided for each tray storage unit 1. Distribution unit 3 includes a push part 31, a guide part 32, and a control part 33.

Push part 31 comes into contact with side portions of trays T to push and move trays T from third transfer unit 4 to tray storage unit 1. Push part 31 projects upward from a transfer surface of third transfer unit 4. Push part 31 moves in a direction crossing third transfer unit 4, and moves in an opening provided in third transfer unit 4.

Guide part 32 guides trays T from third transfer unit 4 toward tray storage unit 1. Guide part 32 performs protruding and retracting movements between the position of the protrusion in the direction crossing third transfer unit 4 and the position of the retraction from third transfer unit 4. Guide part 32 has a role as a stopper that stops trays T transferred by third transfer unit 4 at the position of the protrusion.

Control part 33 controls push part 31, guide part 32, and third transfer unit 4 in accordance with a detection result of detection unit 2. Control part 33 is a microcomputer system that includes a processor, a memory, an input interface, an output interface, and the like.

Third transfer unit 4 transfers empty trays T. Third transfer unit 4 is a transfer unit that transfers trays T in the state of being stacked, and is a conveyor where trays T in the state of being stacked are transferred. Trays T on third transfer unit 4 are distributed to each tray storage unit 1 by distribution unit 3. In the present embodiment, third transfer unit 4 is provided in parallel to first transfer unit 92. Third transfer unit 4 includes a sensor (not illustrated) that senses the arrival of tray T.

Orientation change unit 5 is disposed between third transfer unit 4 and tray storage unit 1. Orientation change unit 5 changes the orientation of trays T to be supplied to tray storage unit 1 and enables trays T to be stored in each tray storage unit 1. Orientation change unit 5 includes a tray support part and a turn part, which are not illustrated. The tray support part supports, from the lower side, trays T in the state of being stacked. The turn part turns the tray support part by 90 degrees. The turn part turns trays T in accordance with the orientation of trays T in tray storage unit 1, in other words, in accordance with the direction in which second transfer unit 95 transfers trays T. That is, the turn part turns the tray support part horizontally between the orientation in which tray T is transferred with its six lines extending in the traveling direction and the orientation in which tray T is transferred with its five lines extending in the traveling direction.

Operations of tray supply device 10 are described next.

Firstly, trays T that are stacked are placed on the upstream side of third transfer unit 4 (step S1). In step S1, trays T may be automatically taken out from a rack (not illustrated) or the like to be supplied to third transfer unit 4 or may be supplied manually by an operator. On the transfer route of third transfer unit 4, trays T can be accumulated, which serve as a buffer.

One of detection units 2 determines whether the amount of trays T falls below a predetermined value (step S2). The one of detection units 2 here is provided, for example, so as to correspond to tray storage unit 1 for supplying trays T to accommodate large (L)-sized eggs E. When the amount of trays T does not fall below the predetermined value, that is, when it is unnecessary to supply additional trays T to tray storage unit 1, trays T are transferred toward the downstream side without getting diverted on third transfer unit 4 that leads to tray storage unit 1 even if the sensor that senses the arrival of tray T senses trays T (step S3).

In contrast, when it is detected in step S2 that the amount of trays T falls below the predetermined value, distribution is performed on third transfer unit 4 that leads to tray storage unit 1 (step S4). In step S4, when the sensor that senses the arrival of tray T senses that trays T have reached a predetermined position after detection unit 2 detects decrease in the amount of trays T, control part 33 of distribution unit 3 causes guide part 32 to protrude in the direction crossing third transfer unit 4 and stops third transfer unit 4. Further, control part 33 moves push part 31 toward the tray storage unit 1 side.

When tray storage unit 1 receives a predetermined signal, tray storage unit 1 drops trays T that have been moved to the tray storage unit 1 side and causes trays T to be accommodated in tray storage unit 1. Further, when tray storage unit 1 receives another predetermined signal, tray storage unit 1 drops and supplies trays T in tray storage unit 1 one by one onto second transfer unit 95.

After step S4, when push part 31 moves to a predetermined position located away from third transfer unit 4, control part 33 of distribution unit 3 resumes transferring trays T by canceling the stop of third transfer unit 4 and causing guide part 32 that has been protruding to retract. Further, after push part 31 moves trays T to the position of tray storage unit 1, control part 33 of distribution unit 3 returns push part 31 to the original position. At that time, interference with trays T moving on third transfer unit 4 can be prevented by push part 31 moving so as to pass below the transfer surface of third transfer unit 4.

Trays T that have been transferred to the downstream side on third transfer unit 4 in step S3 undergo operations the same as or equivalent to the above-described steps in a different one of tray storage units 1 positioned on the downstream side. The different one of tray storage units 1 here, for example, serves to supply trays T to accommodate medium and small (MS)-sized eggs E. When it is detected for the different one of tray storage units 1 that the amount of trays T falls below the predetermined value, trays T transferred without having been distributed to the one of tray storage units 1 are distributed to the different one of tray storage units 1. However, when the detection result of detection unit 2 indicates no necessity of distribution even to the different one of tray storage units 1, trays T are further transferred to the downstream side on third transfer unit 4.

In addition, when the orientation of trays T transferred from third transfer unit 4 in step S4 is different from the orientation of trays T stored in tray storage unit 1, an operation for changing the orientation of the trays is further performed (step S5). Specifically, first, orientation change unit 5 receives trays T that have been moved by push part 31 from third transfer unit 4. After that, the turn part turns the tray support part by 90 degrees with trays T placed on the tray support part. After the stop of the turn, push part 31 further moves trays T to tray storage unit 1.

As described above, tray supply device 10 according to the present embodiment includes tray storage unit 1, detection unit 2, and distribution unit 3. Tray storage units 1 are provided so as to correspond to respective accommodation units 94 that cause eggs E to be accommodated in trays T. Detection unit 2 detects the amount of trays T stored in each tray storage unit 1. Distribution unit 3 distributes empty trays T to each tray storage unit 1 in accordance with a detection result of detection unit 2. Thus, tray supply device 10 that reduces effort and burden involved in an operation can be provided. In particular, it is effective when the number of second transfer units 95 is large.

Since orientation change unit 5 is further included, which changes the orientation of trays T so that trays T are accommodable in each tray storage unit 1, trays T with an orientation that has been adjusted can be supplied.

Distribution unit 3 is provided on third transfer unit 4 that transfers trays T in the state of being stacked, and third transfer unit 4 crosses second transfer unit 95 that transfers trays T from tray storage unit 1 to accommodation unit 94. Moreover, third transfer unit 4 is parallel to first transfer unit 92 where accommodation units 94 are provided. Thus, the area occupied by tray supply device 10 can be made small.

The present invention is not limited to the above-described embodiment. Distribution unit 3 may compare detection results of detection units 2 with each other and determine the order in which trays T are distributed.

Third transfer unit 4 is not limited to what is provided above second transfer unit 95 as long as third transfer unit 4 can supply trays T to tray storage unit 1. Although third transfer unit 4 transfers trays T in the state of being stacked, the number of trays T is not limited to what is illustrated, and trays T may be transferred one by one.

Tray supply device 10 is not necessarily required to include orientation change unit 5. Even when orientation change unit 5 is included, it is not limited to what changes the orientation of trays T at the illustrated position.

Tray T is not limited to what is made of plastic but may be made of paper for example. Further, its shape and the number of eggs E to be accommodated therein are not limited to what is illustrated, either, but may be changed variously.

The embodiments disclosed herein are examples and are not limiting. The present invention is not defined by the scope described above but is defined by the claims, and is intended to include all changes within the purport and scope equivalent to the claims.

INDUSTRIAL APPLICABILITY

The present invention can be utilized for a tray supply device. Aspects of the present disclosure are described below as appendices, collectively.

Appendix 1

A tray supply device comprising:
a tray storage unit provided so as to correspond to one of a plurality of accommodation units that cause eggs to be accommodated in trays;
a detection unit that detects an amount of the trays stored in the tray storage unit; and
a distribution unit that distributes the trays to the tray storage unit in accordance with a detection result of the detection unit.

Appendix 2

The tray supply device according to appendix 1, further comprising an orientation change unit that changes an orientation of the tray so that the tray is accommodable in the tray storage unit.

Appendix 3

The tray supply device according to appendix 1 or 2, comprising a transfer unit that transfers the tray to the distribution unit.

Appendix 4

The tray supply device according to appendix 3, wherein
the distribution unit includes a push part provided so as to correspond to the tray storage unit, and
the push part moves the tray from the transfer unit to the tray storage unit.

Appendix 5

The tray supply device according to appendix 3, wherein
the distribution unit includes a guide part provided so as to correspond to the tray storage unit, and
the guide part guides the tray from the transfer unit to the tray storage unit by protruding to the transfer unit.

Appendix 6

The tray supply device according to any one of appendices 3 to 5, wherein the transfer unit transfers the trays that are stacked.

Appendix 7

An egg sorting device comprising: the tray supply device according to any one of appendices 1 to 6;
a measurement unit that measures a weight of each of the eggs;
a division unit that divides the eggs into the plurality of accommodation units in accordance with a value measured by the measurement unit; and
a tray transfer unit that transfers the trays one by one, wherein
the plurality of accommodation units cause the eggs to be accommodated in the trays transferred on the tray transfer unit.

Appendix 8

An egg sorting device comprising: the tray supply device according to any one of appendices 3 to 6;
a measurement unit that measures a weight of each of the eggs;
a division unit that divides the eggs into the plurality of accommodation units in accordance with a value measured by the measurement unit; and
a tray transfer unit that transfers the trays one by one, wherein
the plurality of accommodation units cause the eggs to be accommodated in the trays transferred on the tray transfer unit, and
the transfer unit is provided above the tray transfer unit.

REFERENCE SIGNS LIST

10 . . . tray supply device
1 . . . tray storage unit
2 . . . detection unit
3 . . . distribution unit
31 . . . push part
32 . . . guide part
33 . . . control part
4 . . . third transfer unit
5 . . . orientation change unit 9 ... egg sorting device
91 ... measurement unit
92 ... first transfer unit
93 ... division unit
94 ... accommodation unit
95 ... second transfer unit
T ... tray
E ... egg

The invention claimed is:

1. A tray supply device comprising:
a plurality of tray storage units that supplies empty trays onto a tray transfer unit;
a detection unit that detects an amount of the empty trays stored in each of the plurality of tray storage units;
a distribution unit that is provided for each tray storage unit of the plurality of tray storage units and distributes the empty trays to a particular one of the plurality of tray storage units when the detection unit detects the amount of empty trays falls below a predetermined value in the particular one of the plurality of tray storage units; and
a transfer unit that transfers the empty trays to the distribution unit,
wherein the transfer unit allows the empty trays to be transferred to a downstream side of the transfer unit passed the particular one of the plurality of tray storage units when the detection unit detects the amount of empty trays stored in the particular one of the plurality of tray storage units does not fall below a predetermined value for the particular one of the plurality of tray storage units or allows the empty trays to be transferred to the distribution unit for distribution to the particular one of the plurality of tray storage units.

2. The tray supply device according to claim 1, further comprising an orientation change unit that changes an orientation of an empty tray so that the empty tray is accommodable in the tray storage unit.

3. The tray supply device according to claim 1, wherein the distribution unit includes a push part provided for each tray storage unit, and each push part moves an empty tray from the transfer unit to one of the tray storage units.

4. The tray supply device according to claim 1, wherein the distribution unit includes a push part that moves an empty tray from the transfer unit to each of the tray storage units, and the tray supply device includes a control unit that drops the empty tray that has been moved to the tray storage unit when a predetermined signal is received.

5. A tray supply device comprising:
a tray storage unit provided for each one of a plurality of accommodation units that cause eggs to be accommodated in trays;
a detection unit that detects an amount of the trays stored in each of the tray storage units;
a distribution unit that distributes the trays to the tray storage units in accordance with a detection result of the detection unit; and
a transfer unit that transfers the trays to the distribution unit,
wherein the distribution unit includes a guide part provided for each tray storage unit, and
each guide part guides an empty tray from the transfer unit to one of the tray storage units by protruding in a direction crossing the transfer unit.

6. An egg sorting device comprising:
the tray supply device according to claim 1;
a measurement unit that measures a weight of eggs;
a tray transfer unit that transfers an empty tray one by one from each of the tray supply units;
a plurality of accommodation units that cause the eggs to be accommodated in an empty tray transferred on the tray transfer unit; and
a division unit that divides the eggs into the plurality of accommodation units in accordance with a value measured by the measurement unit.

7. An egg sorting device comprising:
the tray supply device according to claim 2;
a measurement unit that measures a weight of eggs;
a tray transfer unit that transfers an empty tray one by one from each of the tray supply units;
a plurality of accommodation units that cause the eggs to be accommodated in an empty tray transferred on the tray transfer unit; and
a division unit that divides the eggs into the plurality of accommodation units in accordance with a value measured by the measurement unit.

* * * * *